(12) United States Patent
Calderón Abad

(10) Patent No.: US 11,953,039 B2
(45) Date of Patent: Apr. 9, 2024

(54) ROTATIONALLY ASSEMBLED PLASTIC MESH

(71) Applicant: Eduardo Calderón Abad, Estado de Mexico (MX)

(72) Inventor: Eduardo Calderón Abad, Estado de Mexico (MX)

( * ) Notice: Subject to any disclaimer, the term of this patent is extended or adjusted under 35 U.S.C. 154(b) by 0 days.

(21) Appl. No.: 17/951,664

(22) Filed: Sep. 23, 2022

(65) Prior Publication Data

US 2023/0090725 A1  Mar. 23, 2023

(30) Foreign Application Priority Data

Sep. 23, 2021   (MX) .................... MX/a/2021/011602

(51) Int. Cl.
*F16B 21/02* (2006.01)
*A47C 31/06* (2006.01)
*F16B 7/04* (2006.01)

(52) U.S. Cl.
CPC .............. *F16B 21/02* (2013.01); *A47C 31/06* (2013.01); *F16B 7/0446* (2013.01)

(58) Field of Classification Search
CPC ........ F16B 21/02; F16B 7/0446; A47C 31/06; A47C 7/02; A47C 7/22; A47C 7/40; A47C 23/002
See application file for complete search history.

(56) References Cited

U.S. PATENT DOCUMENTS

| | | | |
|---|---|---|---|
| 8,365,929 B2* | 2/2013 | Luo | A47B 47/0016 211/183 |
| 8,834,975 B1 | 9/2014 | Friedman | |
| 9,939,001 B2* | 4/2018 | Deman | F16B 12/2027 |
| 10,034,542 B2* | 7/2018 | Giovannetti | A47B 47/0091 |
| 10,161,432 B2* | 12/2018 | Nitschmann | F16B 12/20 |
| 10,443,635 B2* | 10/2019 | Cuddy | B64C 1/12 |
| 11,105,355 B2* | 8/2021 | Dietrich | F16B 12/24 |
| 2006/0182492 A1* | 8/2006 | Keller | F16B 13/0858 411/389 |
| 2010/0202852 A1* | 8/2010 | Krause | F16B 12/22 312/263 |
| 2011/0250009 A1 | 10/2011 | Swanson | |
| 2012/0090140 A1* | 4/2012 | Montemayor | E04H 17/143 24/593.1 |
| 2013/0142587 A1* | 6/2013 | Jardel | F16B 5/0642 411/337 |
| 2017/0023041 A1* | 1/2017 | Koelling | F16B 12/26 |
| 2017/0023043 A1* | 1/2017 | Koelling | F16B 12/125 |
| 2018/0154276 A1* | 6/2018 | Oh | A63G 11/00 |
| 2021/0071700 A1* | 3/2021 | Zanette | F16B 7/02 |

FOREIGN PATENT DOCUMENTS

MX  2011000902 A  3/2011
WO  2010011633 A1  1/2010

* cited by examiner

*Primary Examiner* — David M Upchurch
(74) *Attorney, Agent, or Firm* — Rothwell, Figg, Ernst & Manbeck, P.C.

(57) ABSTRACT

Assemblies plastic mesh for the manufacturing of furniture include a plurality of parts that can be used repeatedly, as all of them are made up of first male locking elements and second female locking elements that do not require extraneous fastening elements for their placement. The parts are joined by means of first locking elements and second locking elements (male and female) with a secure and easy-to-put-together assembly without the risk of the parts coming loose.

10 Claims, 14 Drawing Sheets

Section F - F´

Section G - G´

Section H - H´

Section I - I'

Section J - J'

Section K - K'

Section A - A'

Section B - B'

Section C - C'

Section D - D'

Section E - E'

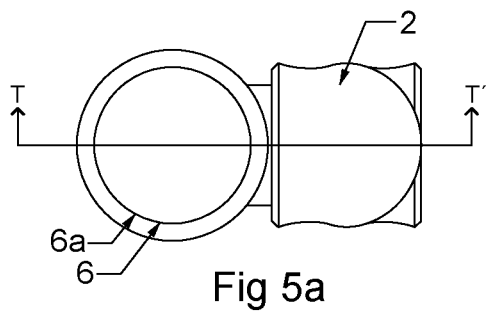
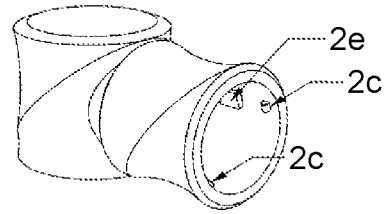
Fig 5a          Fig 5b
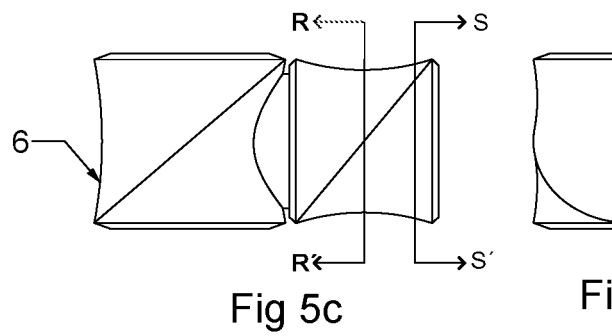
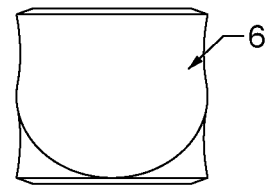
Fig 5c          Fig 5d
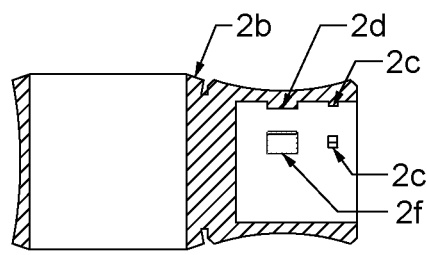
Fig 5e
Section T - T′
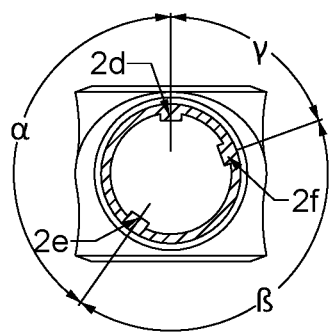
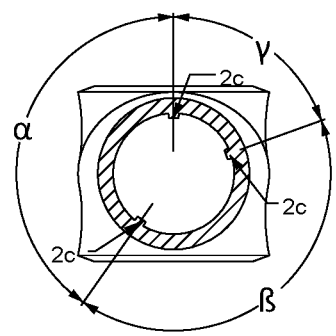
Fig 5f                Fig 5g
Section R - R′       Section S - S′

Section L - L'

Section M - M'

Section N - N'

Section O - O'

Section P - P'

Section Q - Q'

Section U - U'

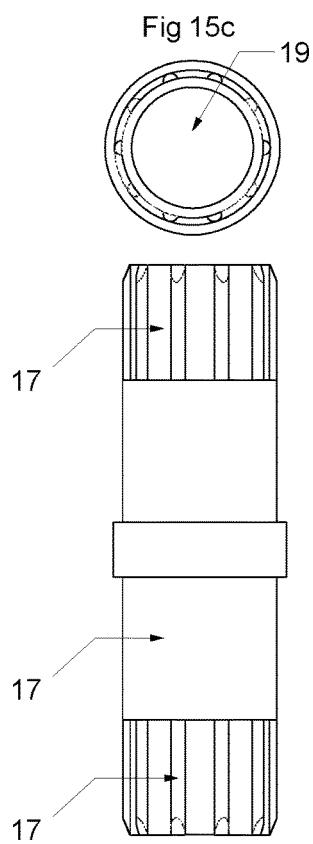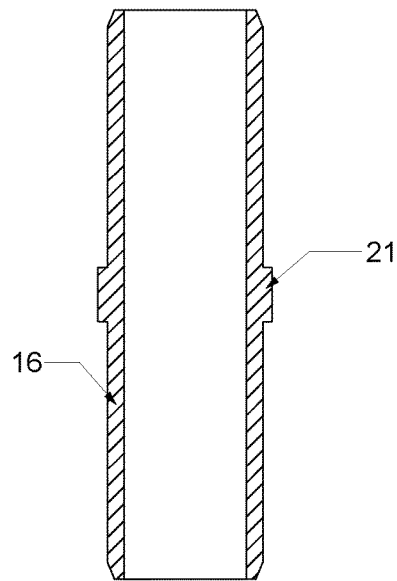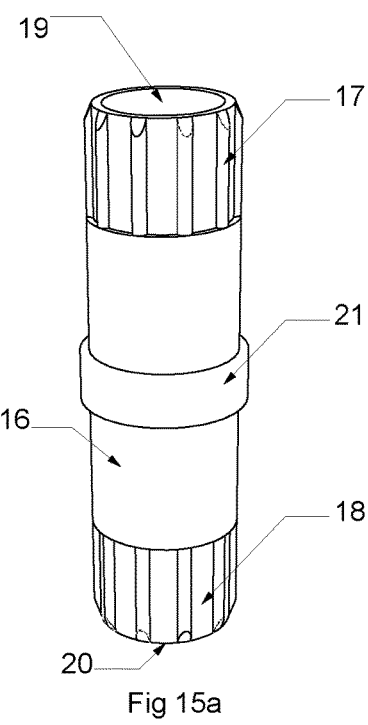
Fig 15c
Fig 15d
Fig 15b
Fig 15a

ROTATIONALLY ASSEMBLED PLASTIC MESH

CROSS REFERENCE TO RELATED APPLICATION(S)

This application claims priority to Mexican Application No. MX/a/2021/011602, filed Sep. 23, 2021, the disclosure of which is incorporated herein by reference in its entirety.

FIELD OF THE INVENTION

The present invention relates to a plurality of parts incorporating coupling and assembly elements in each of them for "weaving" or forming plastic meshes with a variety of structural designs of shape, size, color, etc., which are useful in the furniture, decoration, and architecture sectors. Particularly, the coupling and assembly of the parts are achieved thanks to the configuration of their male and female locking means that are coupled together in a rotating way and secured by means of fastening elements; resulting in a plastic mesh with great structural resistance to the weight applied and to the environment.

BACKGROUND OF THE INVENTION

Within the furniture industry, there is a need to manufacture furniture with characteristics of high resistance to outdoor conditions and use, based on a frame structure with a variety of aesthetic designs that do not imply the need to use a diversity of materials and resources. Currently, there are pieces of furniture made from a frame and various parts that require a variety of other special joining parts for the coupling of the other pieces, and thus be able to form plastic meshes, also referred to herein as "meshes" that are used as structural elements in the manufacture of furniture, for example, in chairs as back elements, support elements or seat elements. However, these meshes become brittle over time because the structural strength of the mesh is mostly concentrated in the joining parts, causing cracks that eventually lead to the total disposal of the piece of furniture.

Although this can result in the generation of meshes with characteristics suitable for installation on frames, this has the disadvantage of requiring additional elements for the assembly of the mesh with the frame, which complicates the final assembly of the furniture because other types of fastener elements are necessary as well as the use of specific tools.

Thus, there are a variety of plastic meshes for obtaining meshes used in the manufacture of furniture. However, other problems related to meshes in the prior art are special meshes that are manufactured from PVC material threads, where a person weaves the mesh on the same frame without the need for additional elements that act as coupling or joining means. However, factors such as labor, design as well as the time required to manufacture them increase costs. In addition, the strength characteristics of PVC thread are considerably affected by the environment within which it is exposed.

Thus, there is no known system and method of plastic mesh formed from a plurality of plastic injection molded parts that are assembled or "woven" in a rotational manner with one another without the need for special tooling or other materials as opposed to what is known in the prior art.

For instance, Mexican Patent 322495 discloses a multi-layered support structure that provides ergonomic and adaptive seating support; the multi-layered support structure includes multiple cooperative layers to maximize overall comfort and support while improving adaptation to localized variations in a load, such as in the load applied when a person sits in a chair; each of the cooperative layers includes elements such as pixels, springs, support rails and other elements to provide this adaptive comfort and support; the multi-layered support structure also uses aligned material to provide a flexible yet durable support structure; accordingly, the multi-layered support structure provides maximum comfort for a wide range of body shapes and sizes. The foregoing Mexican patent is considered to solve comfort problems. However, in order to achieve its purpose, it uses an endless number of elements, so it cannot be used to form meshes of elements.

On the other hand, U.S. patent application US2011250009 discloses a reconfigurable furniture apparatus including a hinge assembly. The hinge assembly includes a plurality of link plates each comprising at least two parallel flat surfaces and at least one bore extending through the flat surfaces. A connecting rod extends through holes in the flat surfaces that provide an axis of rotation for the connecting plates. Two end caps are attached to the coupling rod ends, where the end caps are operable to create a tensile force along the connecting rod to provide a degree of resistance to rotation between the flat surfaces of the link plates. The means join at least two joining assemblies in which the positions of the connecting plates are reconfigurable to form furniture. It should be noted that, in this structure, the rods have the function of securing the other parts and are installed with the help of tools.

Finally, U.S. Patent U.S. Pat. No. 8,834,975 discloses a modular block system consisting of a plurality of puzzle-type and independent block elements for forming furniture, table, wall, and floor coverings. Nevertheless, securing the blocks is achieved through magnetic elements or magnets, where the resistance of the system depends on the magnetic attraction force.

It is known to those skilled in the art that there is a need for mesh methods and systems where the parts themselves comprise coupling and securing means which hold the parts together uniformly and thereby form meshes that can be assembled into frames of chairs, benches, beds, etc.

There is also a need for a novel configuration of parts for the assembly of the woven mesh with a furniture frame.

The present invention seeks to provide parts that together, by means of novel locks, can form meshes that can be coupled to frames.

OBJECTS OF THE INVENTION

In accordance with the present invention, the main object of the present invention is to provide a plastic mesh system comprising a plurality of parts that are coupled to each other.

A second object of the present invention is to provide parts with coupling and assembly elements incorporated in each part to "weave" or form meshes with a variety of structural designs with both load-bearing capacity and flexibility.

A third object of the present disclosure is to provide a plastic mesh system where the parts comprise rotatable locking elements that can only be assembled and released in a single position without the need for special tools.

A fourth object of the present disclosure is to provide a plastic mesh system wherein the locking elements of its parts comprise female locking means and male locking means.

A fifth object of the present disclosure is to provide a plastic mesh system in which the parts can be of different colors so that woven meshes with visual patterns can be created to the user's liking.

A sixth object of the invention is to provide a method and plastic mesh system for manually forming meshes so that even a user can assemble and attach the mesh(es) to the frame of a piece of furniture after shipment or delivery.

A seventh object of the invention is to provide a plastic mesh system to obtain final parts that are easily attached to a frame and that, by being generated through a plastic injection process, advantages in manufacturing times, costs, homogeneity in their molding, and high resistance to weathering may be obtained.

Accordingly, the embodiments of the invention comprise a combination of features and advantages that substantially improve the fabrication and structure of plastic meshes known in the art. These and various other features and advantages of the invention will be readily apparent to those skilled in the art by reading the following detailed description of preferred embodiments of the invention and referring to the attached drawings.

BRIEF DESCRIPTION OF THE DRAWINGS

For a detailed description of the preferred embodiments of the invention, reference will now be made to the attached drawings, where:

FIGS. 5a, 5b, 5c, 5d, 5e, 5f, and 5g illustrate a fifth part of the system of the present invention.

FIGS. 15a, 15b, 15c, and 15d illustrate a tenth part of the system of the present invention.

DETAILED DESCRIPTION OF THE PREFERRED EMBODIMENTS

Firstly, it should be clearly understood that similar reference numbers are used to identify the same elements consistently in the various figures since such elements can be explained or described in greater depth throughout the complete written specification, of which this detailed description is an integral part.

The embodiments described herein comprise a combination of advantages and features intended to address various deficiencies associated with certain prior devices, systems, and methods. The foregoing has more broadly outlined the characteristics and technical advantages of the disclosed embodiments so that the detailed description that follows can be better understood. The various features and advantages described above, as well as others, will become apparent to those skilled in the art once the detailed description has been read and by consulting the accompanying figures. It should be noted that the design and specific embodiments disclosed can readily be used as a basis for modifying or designing other parts to accomplish the same purposes as the disclosed embodiments.

As used herein, for the manufacturing of furniture it is necessary to use plastic mesh meshes of a rotary assembly comprising parts that are joined by means of first locking elements and second locking elements (male and female), which can be used in the manufacture of meshes comprising parts of greater strength at the joints and that are easy to assemble. As is the case of the present invention, the parts comprise a secure and easy-to-put-together assembly without the risk of the parts coming loose.

In the field of furniture design, there have been a number of disadvantages with respect to the state of the art since, in the first place, there are no parts that can be directly coupled together to form a mesh, so there is no possibility that they can be assembled by means of locks attached directly on the parts.

In this respect, the present invention comprises a series of parts consisting of and utilizing male locking means and female locking means, wherein these means can be assembled (knitted) in such a way that they can be mounted on frames and can be color matched, which in turn ensure a perfect coupling between parts. Among the materials used, polymers that confer strength to the mesh are preferred. However, it is possible to use any type of material that can be processed to form the parts.

The parts described below are made up of male and female locking means, which are common to all parts, and which vary in quantity and/or are omitted depending on the part described.

Figure 1A:
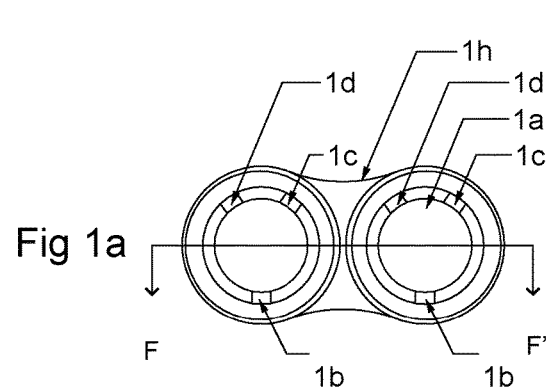
FIGS. 1a, 1b, 1c, 1d, 1e, 1f, and 1g illustrate a first part of the system of the present invention.
Figure 1B:
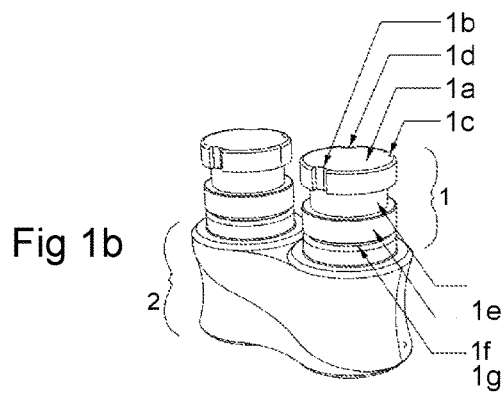
Figure 1C:
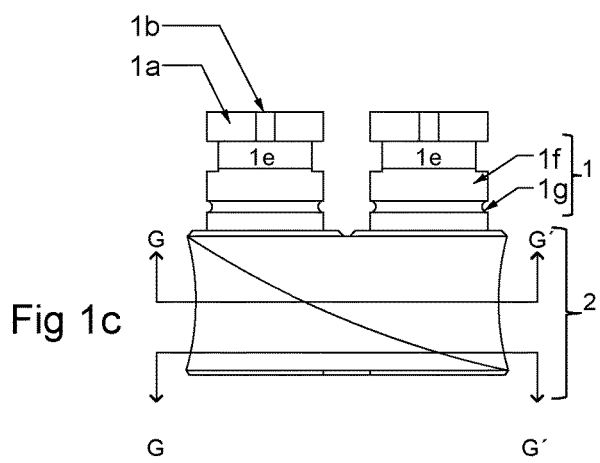
Figure 1D:
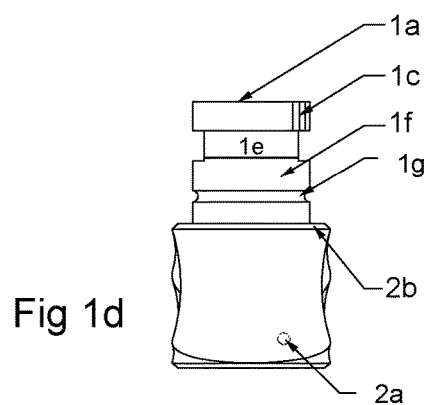
Figure 1E:
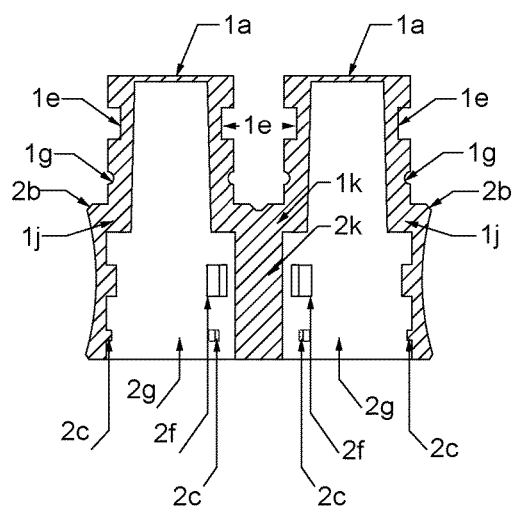
Figure 1F:
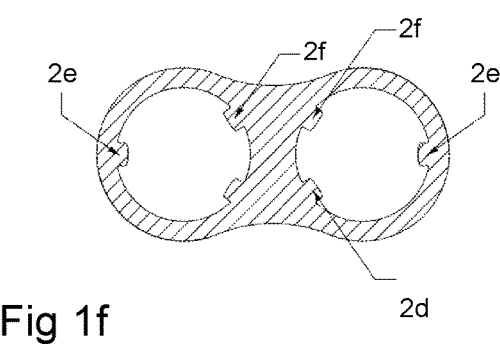
Figure 1G:
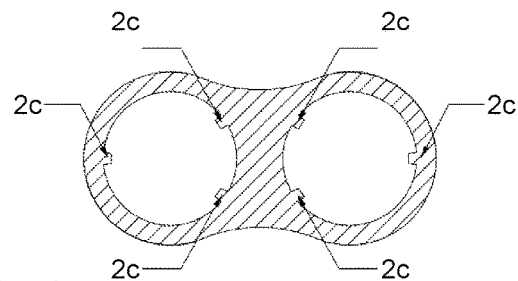

FIGS. 1a, 1b, 1c, 1d, 1e, 1f, and 1g illustrate a first part of the system of the present invention; the figures show different views of the same part; FIG. 1a shows a top view of the first part, FIG. 1b shows a top right perspective view of the first part; FIG. 1c shows a front view of the first part; FIG. 1d shows a right side view of the first part; FIG. 1e shows section F-F' of FIG. 1a, FIG. 1f shows section G-G' of FIG. 1c and FIG. 1g shows section H-H' of FIG. 1c. In particular, said part comprises first male locking means (1) which, in this first part, are two male stems starting from approximately the middle portion (2b) of the part along its vertical length and separated by a separation surface (1h). The male locking means (1) further comprise a substantially cylindrical shape featuring a number of intrinsic elements since said male locking means (1) are formed by a base portion (10 featuring a secondary locking channel (1g), which is located at approximately the middle part of the base portion (10 and runs around its entire perimeter. From the base portion (10, there is a primary locking channel (1e) which runs around its entire perimeter, and from the primary locking channel (1e), there is a coupling head (1a) with a diameter similar to the diameter of the base portion (10, which in turn has recesses (1b, 1c, and 1d) located on the periphery and which comprise a 70Q gap and two 145Q gaps.

The female locking means (2) of the first part comprise on the outside a front face and a rear face which are limited at each end by a rounded side face. In the first part, there are two female housings for the preferred embodiment, without being limited to this amount, which can receive two male stems. On one of the side faces there is a guide point (2a) that will be used to couple the parts. The female locking means (2) in the interior comprise female housings (2g) defining cylindrical perforations wherein the interior comprises first projections (2d, 2e and 2f) which have the same distribution as recesses (1b, 1c, and 1d) in the male locking means, such that there is an angle (α) of 145°, an angle (β) of 145° and an angle (γ) of 70°; likewise, the interior comprises second projections (2c) which are smaller in size than the first projections (2d, 2f, and 2e) and which in turn have angles (8) and (A) of 120°. In order to have a better part strength, there is a reinforcement zone (1j) in the transition zone between the female locking means (2) and the male locking means (1) while in the intermediate part, between each male member set (1) and female member set (2) there is an intermediate reinforcement zone (1k) which starts from the transition part of the male member (1) with the female member (2) and which runs towards the lower area of the part forming an intermediate reinforcement zone (2k). As it can be appreciated, the reinforcement zones allow having solid parts that, when the mesh is being formed, said mesh is resistant to use.

Figure 2A:
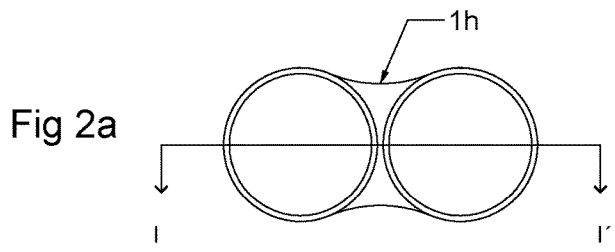
FIGS. 2a, 2b, 2c, 2d, 2e, 2f, and 2g illustrate a second part of the system of the present invention.
Figure 2B:
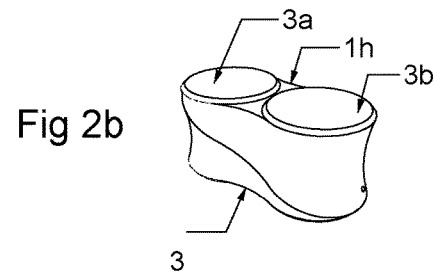
Figure 2C:
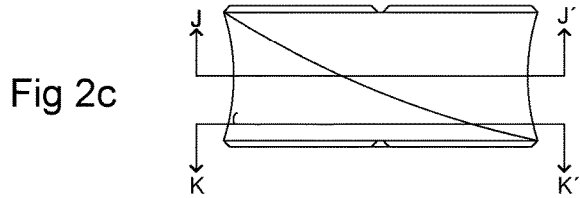
Figure 2D:
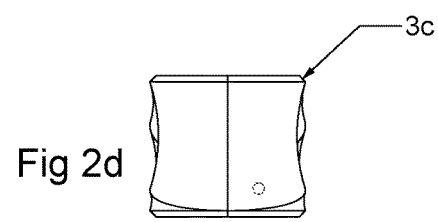
Figure 2E:
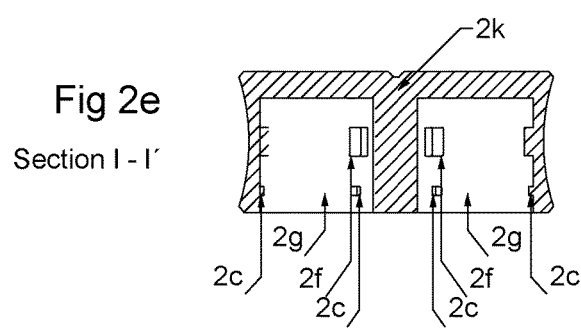
Figure 2F:
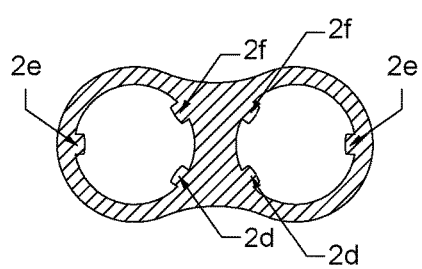
Figure 2G:
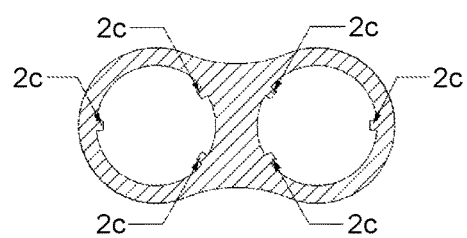

FIGS. 2a, 2b, 2c, 2d, 2e, 2f, and 2g illustrate a second part of the system of the present invention. The figures show different views of the same part; FIG. 2a shows a top view of the second part, FIG. 2b shows a top right perspective view of the second part; FIG. 2c shows a front view of the second part; FIG. 2d shows a right-side view of the second part; FIG. 2e shows section I-I' of FIG. 2a, FIG. 2f shows section J-J' of FIG. 2c and FIG. 2g shows section K-K' of FIG. 1c. In particular, there are female locking means (3) which, in this second part, are two housings that run from the upper surfaces (3a and 3b) and are divided by a separating surface (1h).

The female locking means (3) of the second part comprise on the outside a front face and a rear face limited at each end by a rounded side face; on this second part two female housings (2g) are formed, which can receive two male stems. On the side face, there is at least one guide point (2a), shown in FIG. 1d, which will serve to couple the parts.

The female locking means (3) define female housings (2g) and inside them, there are first projections (2d, 2f, and 2e) which have the same distribution as the recesses in the male locking means, so that there is an angle (α) of 145°, an angle (β) of 145°, and an angle (γ) of 70°. Furthermore, on the inside, there are second projections (2c) which are smaller in size than the first projections (2d, 2f, and 2e) and which have angles (8) and (A) of 120°. In order to have reinforcement for the part, there is an intermediate reinforcement zone (2k) in the intermediate part between the upper surfaces (3a and 3b) that extends towards the lower portion of the part. As it can be noticed, the reinforcement zones allow having solid parts which, at the moment of forming the mesh, said mesh is resistant to use.

Figure 3A:
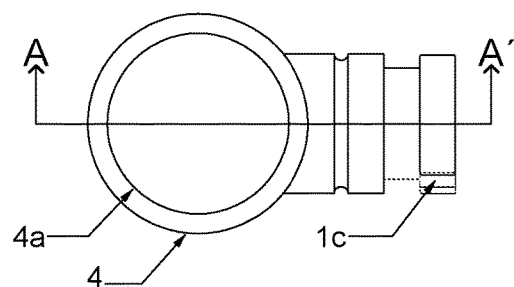
FIGS. 3a, 3b, 3c, 3d, and 3e illustrate a third part of the system of the present invention.
Figure 3B:
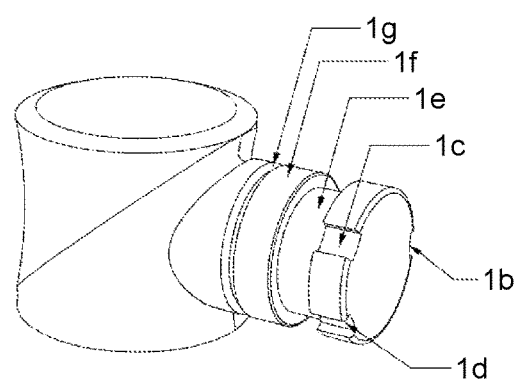
Figure 3E:
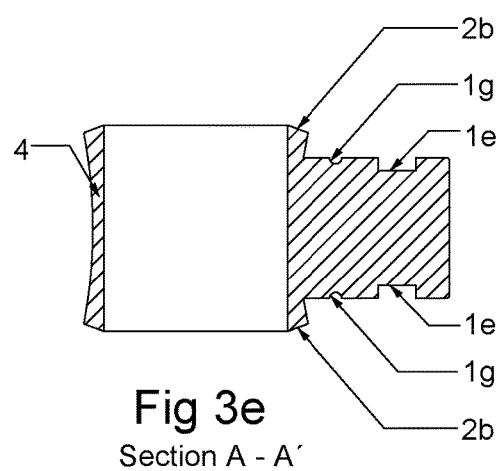
Figure 3C:
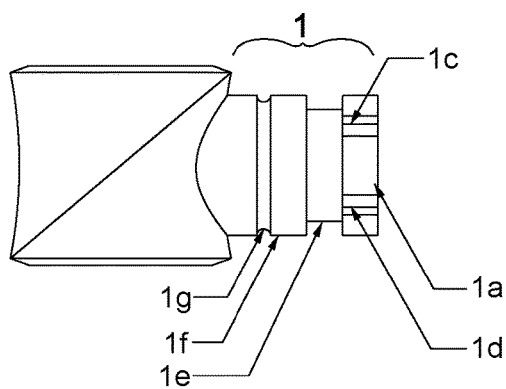
Figure 3D:
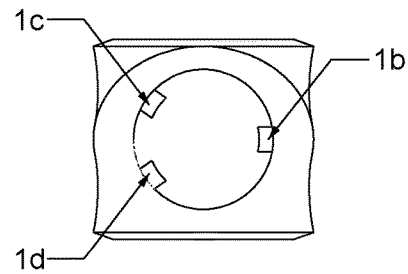

FIGS. 3a, 3b, 3c, 3d, and 3e illustrate a third part of the system of the present invention. The figures show different views of the same part; FIG. 3a shows a top view of the third part, FIG. 3b shows a right top perspective view of the third part; FIG. 3c shows a front view of the third part; FIG. 3d shows a right-side view of the third part; FIG. 3e shows section A-A' of FIG. 3a. In particular, there are male locking means (1) and assembly elements (4) which, in this third part consist of a male stem that starts from approximately the middle portion (2b) of the part; the male locking means (1) comprise a substantially cylindrical shape having a series of intrinsic elements; the male locking means (1) are formed by a base portion (10 comprising a secondary locking channel (1g) which is located at approximately the middle section of the base portion (10 and runs around the entire perimeter. From the base portion (1f) a primary locking channel (1e) runs around the perimeter and from the primary locking channel (1e) a coupling head (1a) comprises a diameter similar to the diameter of the base portion (10. Moreover, the coupling head (1a) has recesses (1b, 1c, and 1d) which are located on the periphery and comprise one 70° gap and two 145° gaps. The second portion of the third part refers to an assembly means (4) which couples to a frame, this assembly means (4) may be, but is not limited to, a coupling cylinder (4) which comprises the completely hollow inner diameter (4a) in order to be able to introduce a frame which is preferably cylindrical. It is important to mention that in the preferred embodiment there is a cylinder. However, this third part may comprise a different shape, which will be coupled to the shape of the frame.

Figure 4A:
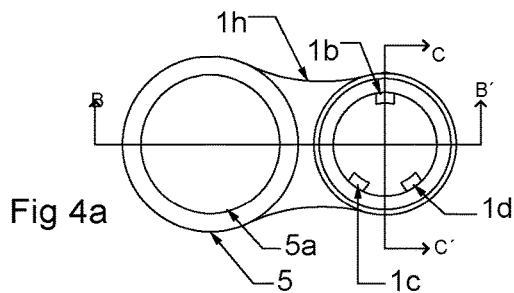
FIGS. 4a, 4b, 4c, 4d, 4e, 4f, 4g and 4h illustrate a fourth part of the system of the present invention.
Figure 4B:
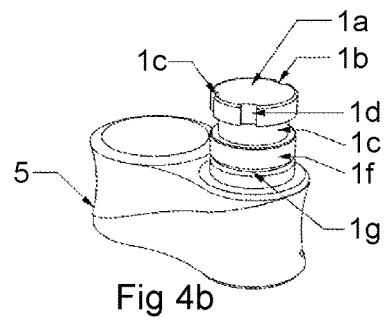
Figure 4C:
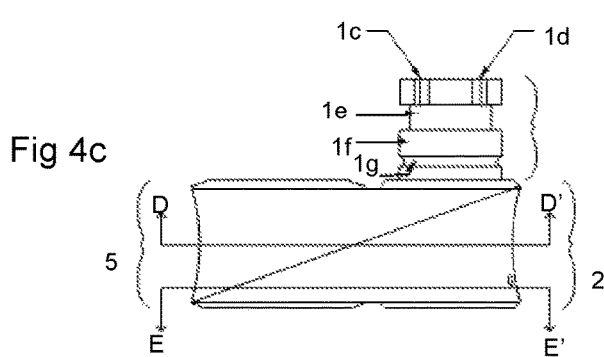
Figure 4D:
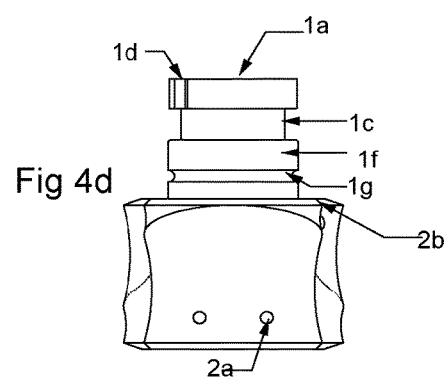
Figure 4E:
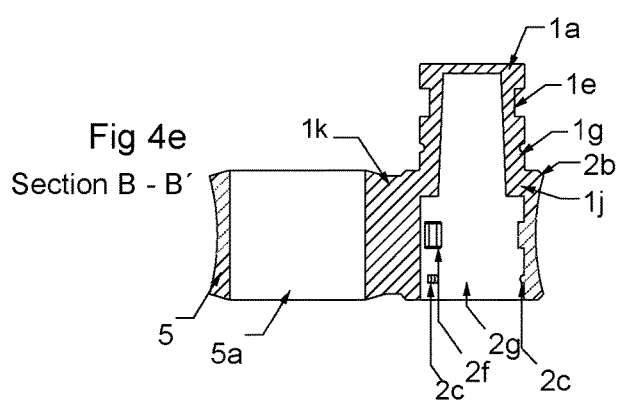
Figure 4F:
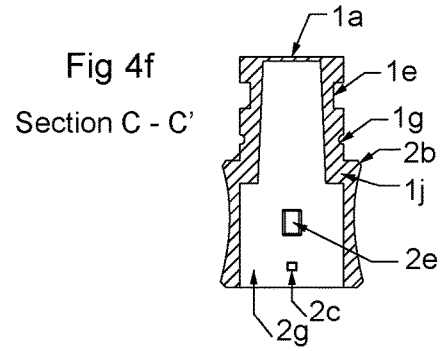
Figure 4G:
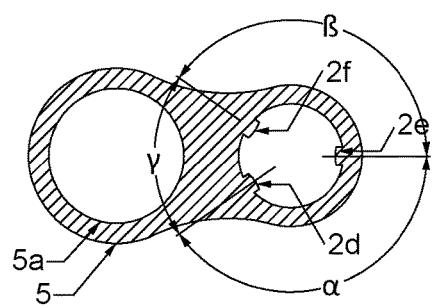
Figure 4H:
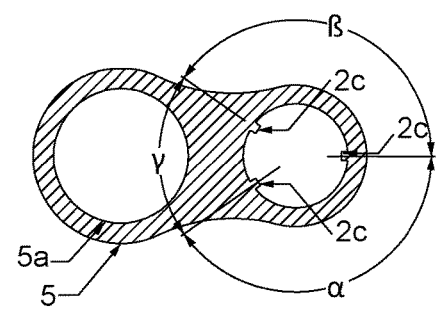

FIGS. 4a, 4b, 4c, 4d, 4e, 4f, 4g and 4h illustrate a fourth part of the system of the present invention. The figures show different views of the same part; FIG. 4a shows a top view of the fourth part, FIG. 4b shows a right top perspective view of the fourth part; FIG. 4c shows a front view of the fourth part; FIG. 4d shows a right-side view of the fourth part; FIG. 4e shows section B-B' of FIG. 4a, FIG. 4f shows section C-C' of FIG. 4a; FIG. 4g shows section D-D' of FIG. 4c and FIG. 4h shows section E-E' of FIG. 4c. In particular, there are male locking means (1) which in this fourth part correspond to a male stem that starts from approximately the middle portion (2b) of the part in its vertical length and is separated from an assembly means (5) by a separating surface (1h). The male locking means (1) comprise a substantially cylindrical shape comprising a series of intrinsic elements; the male locking means (1) are formed by a base portion (10 comprising a secondary locking channel (1g) which is located at approximately the middle section of the base portion (10 and runs around the entire perimeter. From the base portion (10, a primary locking channel (1e) runs around the perimeter. From the primary locking channel (1e) there is a coupling head (1a) comprising a diameter similar to the diameter of the base portion (10 with recesses (1b, 1c, and 1d) located on the periphery, which include a 70° gap and two of 145° gaps.

There are female locking means (2) of the fourth part consisting of a front face and a rear face limited at each end by a rounded side face; in the fourth part, a female housing (2g) is further defined, which can receive a male stem. On the side face, there is a guide point (2a) that will be used to couple the parts. The female locking means (2) in the interior comprise a female housing (2g) having first projections (2d, 2f and 2e) inside, which comprise the same distribution as the recesses (1b, 1c, and 1d) in the male locking means, such that there is an angle (α) of 145°, an angle (β) of 145° and an angle (γ) of 70°; likewise, the interior comprises second projections (2c) which are smaller in size than the first projections (2d, 2f, and 2e) and have angles (8) and (A) of 120°. In order to have a better part strength, there is a reinforcement zone (1j) in the transition zone between the female locking means (2) and the male locking means (1); while in the intermediate part between the male locking assembly (1) and the assembly means (5), there is an intermediate reinforcement zone (1k) which starts from the middle portion and runs towards the lower portion of the part. As it can be appreciated, the reinforcement zones allow having solid parts that, when the mesh is being formed, said mesh is resistant to use.

The second portion of the fourth part relates to an assembly means (5) which serves to couple to a frame, this assembly means (5) may be but is not limited to a coupling cylinder (5) which comprises an inner diameter (5a) which is completely hollow in order to be able to insert a frame which is preferably cylindrical. It is important to mention that in the preferred embodiment there is a cylinder. However, this fourth part may comprise a different shape, which will be coupled to the shape of the frame.

FIGS. 5a, 5b, 5c, 5d, 5e, 5f, and 5g illustrate a fifth part of the system of the present invention. The figures show different views of the same part; FIG. 5a shows a top view of the fifth part, FIG. 5b shows a top right perspective view of the fifth part; FIG. 5c shows a front view of the fifth part; FIG. 5d shows a left side view of the first part; FIG. 5e shows the T-T' section of FIG. 5a, FIG. 5f shows the R-R' section of FIG. 5c and FIG. 5g shows the S-S' section of FIG. 5c. In particular, there are first female means (2) which in this first part correspond to a female housing which starts from approximately the middle portion (2b) of the part in its horizontal length.

The female locking means (2) of the fifth part comprise a cylindrical shape on the outside; in the fifth part, there is a female housing that can receive a male stem and an assembly means (6). On the side face there is a guide point (2h) not shown in the figures, which will be used to couple the parts. The female locking means (2) inside define a female housing (2g) comprising first projections (2d, 2f, and 2e) which have the same distribution of the recesses as the male locking means, such that there is an angle ($\alpha$) of 145°, an angle ($\beta$) of 145°, and an angle ($\gamma$) of 70°; likewise, the interior comprises second projections (2c) which are smaller in size than the first projections (2d, 2f, and 2e) and which have angles ($\epsilon$) ($\theta$) and ($\lambda$) of 120°. In order to have a better part strength, there is a reinforcement zone (1j) in the transition zone between the female locking means (2) and the assembly means (6). As it can be noticed, the reinforcement zones allow having solid parts which, at the moment of forming the mesh, said mesh is resistant to use.

The second portion of the fourth part relates to an assembly means (6) which serves to couple to a frame, this assembly means (6) may be, but is not limited to, a coupling cylinder (6) which comprises an inner diameter (6a) which is completely hollow in order to be able to insert a frame which is preferably cylindrical. It is important to mention that in the preferred embodiment there is a cylinder. However, this fourth part may comprise a different shape, which will be coupled to the shape of the frame.

Figure 6A:
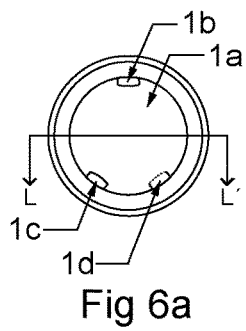
FIGS. 6a, 6b, 6c, 6d, 6e, 6f, and 6g illustrate a sixth part of the system of the present invention.
Figure 6B:
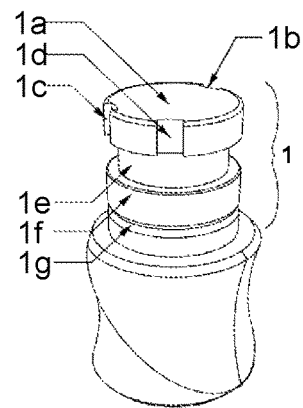
Figure 6C:
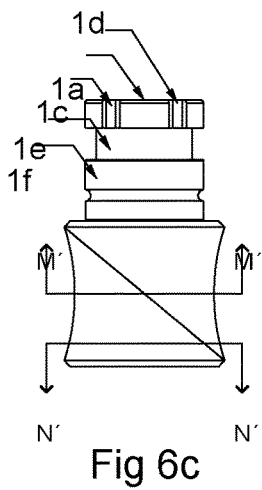
Figure 6D:
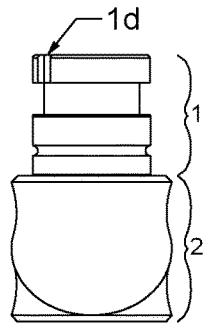
Figure 6E:
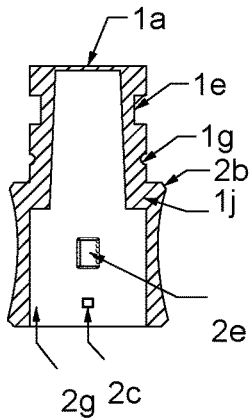
Figure 6F:
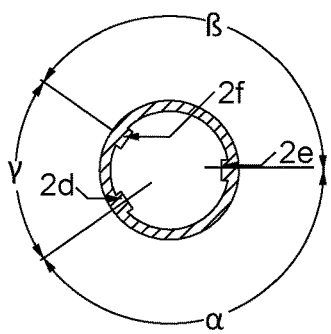
Figure 6G:
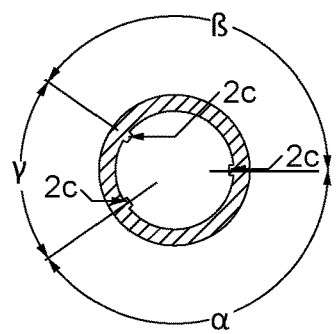

FIGS. 6a, 6b, 6c, 6d, 6e, 6f, and 6g illustrate a sixth part of the system of the present invention. The figures show different views of the same part; FIG. 6a shows a top view of the sixth part, FIG. 6b shows a top right perspective view of the sixth part; FIG. 6c shows a front view of the sixth part; FIG. 6d shows a right-side view of the sixth part; FIG. 6e shows section L-L' of FIG. 6a, FIG. 6f shows section M-M' of FIG. 6c and FIG. 6g shows section N-N' of FIG. 6c. In particular, there are male locking means (1) which, in this sixth part, consist of a male stem that starts from approximately the middle portion (2b) of the part in its vertical length; the male locking means (1) comprise a substantially cylindrical shape having a series of intrinsic elements; the male locking means (1) are formed by a base portion (10 comprising a secondary locking channel (1g) which is located at approximately the middle section of the base portion (10 and runs around the entire perimeter; from the base portion (10, a primary locking channel (1e) runs around the entire perimeter. From the primary locking channel (1e) there is a coupling head (1a) comprising a diameter similar to the diameter of the base portion (10 with recesses (1b, 1c, and 1d) located on the periphery, which include a 70° gap and two 145° gaps.

The female locking means (2) of the sixth part comprise on the outside a cylindrical shape; in the sixth part, there is a female housing of cylindrical shape (without being limited to this shape), which can receive a male stem. The female locking means (2) in the interior comprise a female housing (2g) having first projections (2d, 2f, and 2e), which comprise the same distribution as the recesses (1b, 1c, and 1d) in the male locking means, so that there is an angle ($\alpha$) of 145°, an angle ($\beta$) of 145° and an angle ($\gamma$) of 70°; likewise, the interior comprises second projections (2c) which are smaller in size than the first projections (2d, 2f, and 2e) and have angles ($\epsilon$) ($\theta$) $\gamma$ ($\lambda$) of 120°. In order to have a better part strength, a reinforcement zone (1j) is provided in the transition zone between the female locking means (2) and the male locking means (1). As it can be noticed, the reinforcement zones allow having solid parts which, at the moment of forming the mesh, said mesh is resistant to use.

Figure 7A:
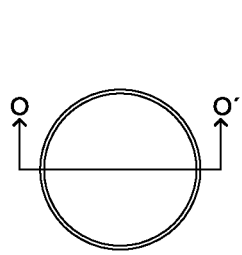
FIGS. 7a, 7b, 7c, 7d, 7e, 7f, and 7g illustrate a seventh part of the system of the present invention.
Figure 7B:
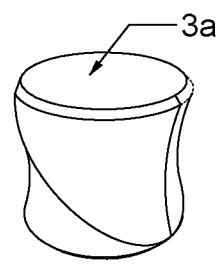
Figure 7C:
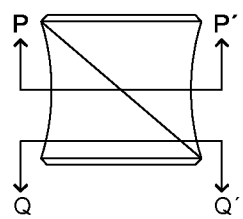
Figure 7D:
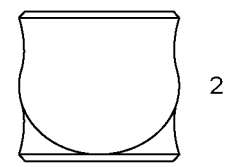
Figure 7E:
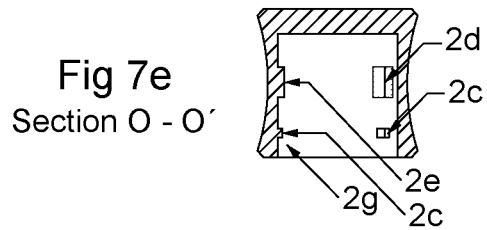
Figure 7F:
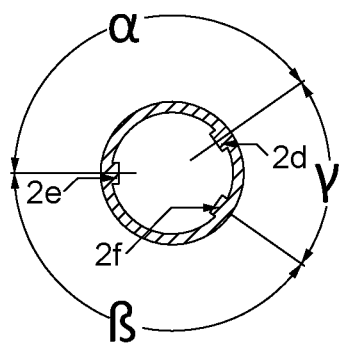
Figure 7G:
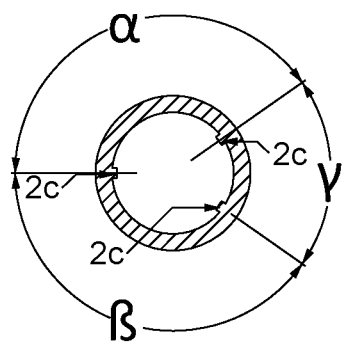

FIGS. 7a, 7b, 7c, 7d, 7e, 7f, and 7g illustrate a seventh part of the system of the present invention. The figures show different views of the same part; FIG. 7a shows a top view of the seventh part, FIG. 7b shows a top right perspective view of the seventh part; FIG. 7c shows a front view of the seventh part; FIG. 7d shows a right-side view of the seventh part; FIG. 7e shows section O-O' of FIG. 7a, FIG. 7f shows section P-P' of FIG. 7c and FIG. 7g shows section Q-Q' of FIG. 7c. In particular, the seventh part corresponds to an end piece defining female locking means (2) with an internal housing starting from the upper surface (3a).

The female locking means (2) of the seventh part comprises on the outside a cylindrical shape; in the seventh part, a female housing is formed, which can receive a male stem. On the inside, the female locking means (3) comprise a female housing (2g) and first projections (2d, 2f, and 2e) with the same distribution as the recesses in the male locking means of other parts, so that there is an angle ($\alpha$) of 145°, an angle ($\beta$) of 145°, and an angle ($\gamma$) of 70°; likewise, on the inside, there are second projections (2c) which are of smaller size than the first projections (2d, 2f, and 2e), with angles ($\epsilon$) ($\theta$) and ($\lambda$) of 120°.

Figure 8A:
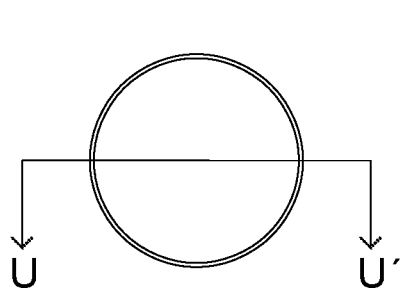
FIGS. 8a, 8b, 8c, 8d, and 8e illustrate an eighth part of the system of the present invention.
Figure 8B:
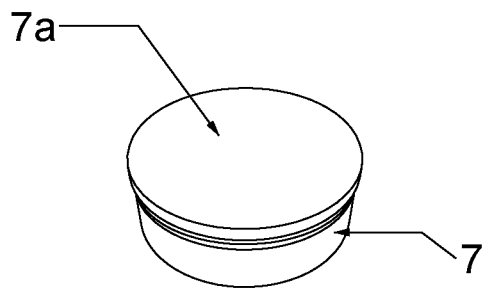
Figure 8C:
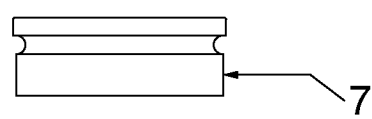
Figure 8D:
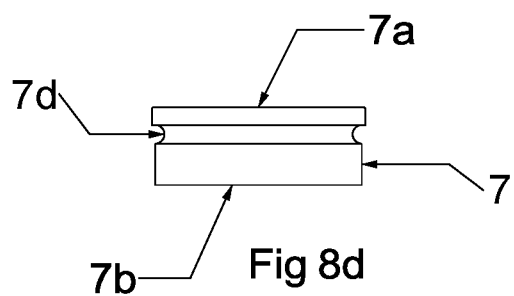
Figure 8E:
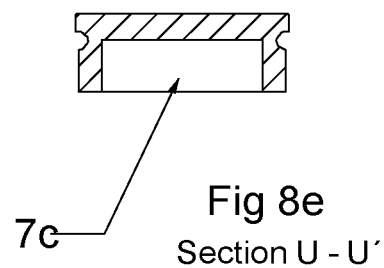

FIGS. 8a, 8b, 8c, 8d, and 8e illustrate an eighth part of the system of the present invention. The figures show different views of the same part; FIG. 8a shows a top view of the eighth part, FIG. 8b shows a top right perspective view of the eighth part; FIG. 8c shows a front view of the eighth part; FIG. 8d shows a right side view of the eighth part; FIG. 8e shows section U-U' of FIG. 8a. Said eighth part (7) serves as a cover for closing the female locking means AND is defined by a cylindrically shaped body (7) having a closed upper surface (7a) and an open lower end (7b) defining a hollow housing (7c). Both ends are separated by a low relief perimeter ring (7d) that provides flexibility to the part allowing it to be compressed or extended during its coupling or detachment.

Figure 9:
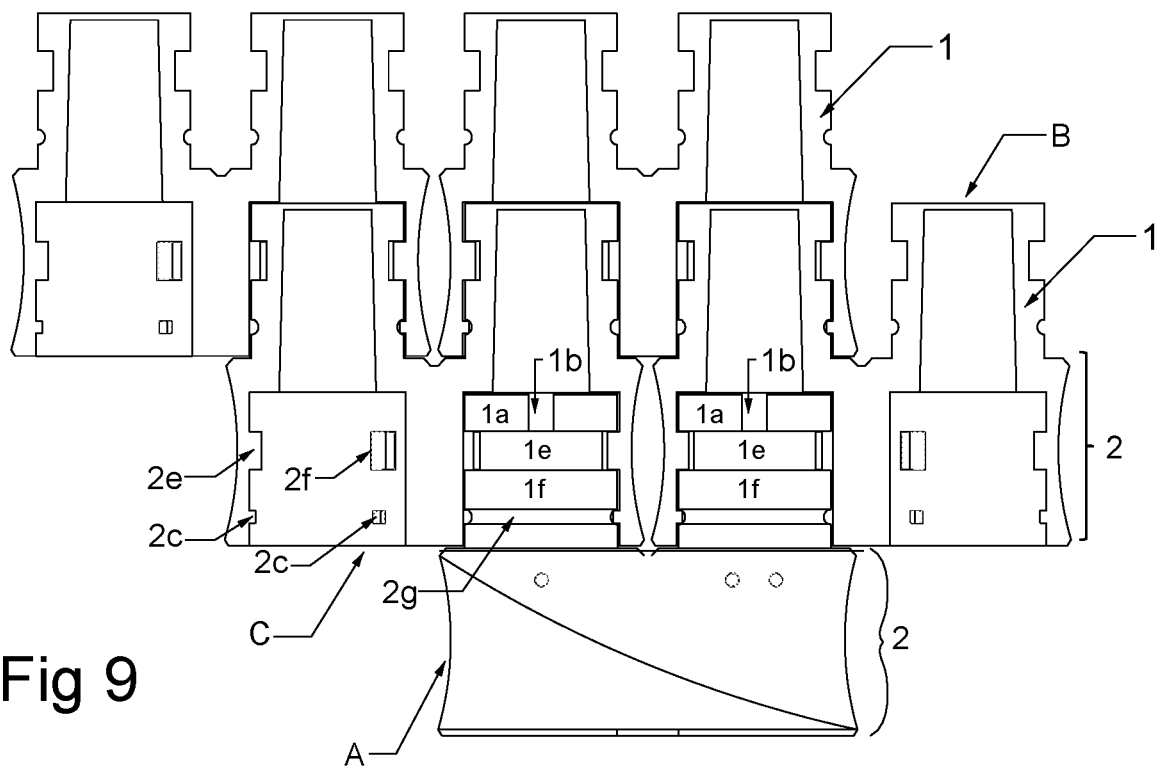
FIG. 9 illustrates an assembly of parts in a sectional view.

FIG. 9 illustrates a cross-sectional view of the assembly between parts. As seen in said figure, there are five parts that form the main body of the mesh. As shown in FIG. 9, the male locking means (1) are inserted into female locking means (2) so as to form a mesh with the elements in a staggered manner; in particular, the first parts (A, B, and C) that have been fully described in FIGS. 1a, 1b, 1c, 1d, 1e, 1f, and 1g are illustrated. The two male locking means (1) are positioned in the female locking means (2), and once the part is assembled, the projections (2f) are positioned inside the primary locking channel (1e) so that the coupling head (1a) remains attached to the bottom of the female locking means (2). On the other hand, the base portion (10 is coupled to the wall of the female locking means (2) wherein the second projections (2c) are fitted into the secondary locking channel (1g). As seen in FIG. 9, meshes can be woven where the parts are used in any required quantity. Advantageously, there are first locking means defined by the projection (2f) positioned within the primary locking channel (1e), and the second locking means are defined by the second projections (2c) engaged in the secondary locking channel (1g). The first locking means allow to secure the parts and thus confer strength to the mesh, while the second locking means help to prevent the parts from slipping out of position in case the first locking means are in the disassembled position (FIG. 10), keeping the parts from moving out of position until a higher force is applied to release the second locking means to disassemble the parts; therefore, this combination of locking means helps to form meshes in a safe and efficient way.

Figure 10:
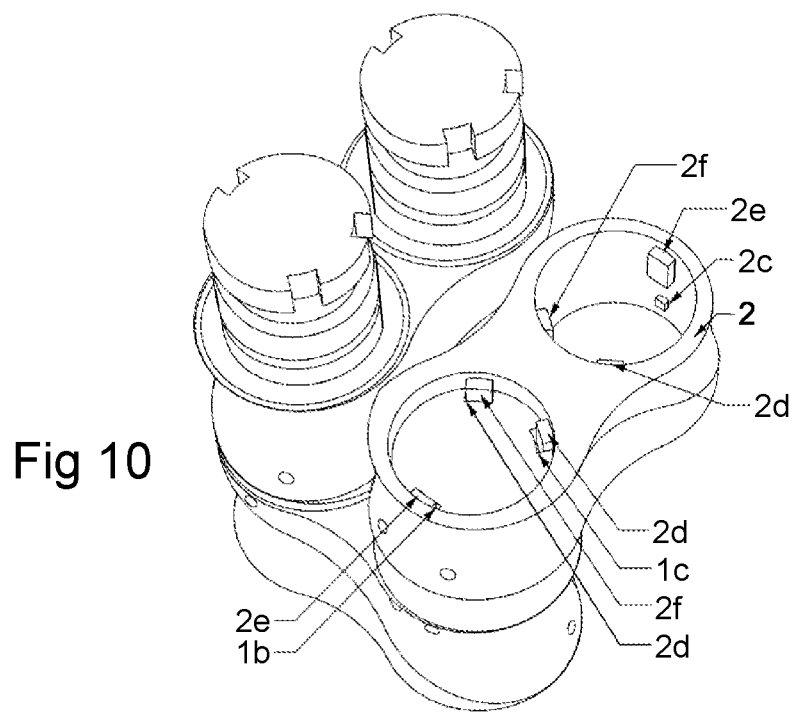
FIG. 10 illustrates an assembly of parts in sectional and perspective views.

FIG. 10 illustrates an assembly of parts in sectional and perspective views. As illustrated, there are female locking means (2) which, in this case, are shown in sectional view to display the recesses (1b, 1c, and 1d) that allow the first projections (2d, 2f, and 2e) to pass through in a sliding manner. For the assembly of each mesh, it is necessary to place the parts at an angle of in a specific position. The coupling head (1a) passes the first projections (2d, 2f, and 2e), therefore securing the pieces and preventing them from decoupling with the movement of the part, while the meshes can be formed correctly.

Figure 11:
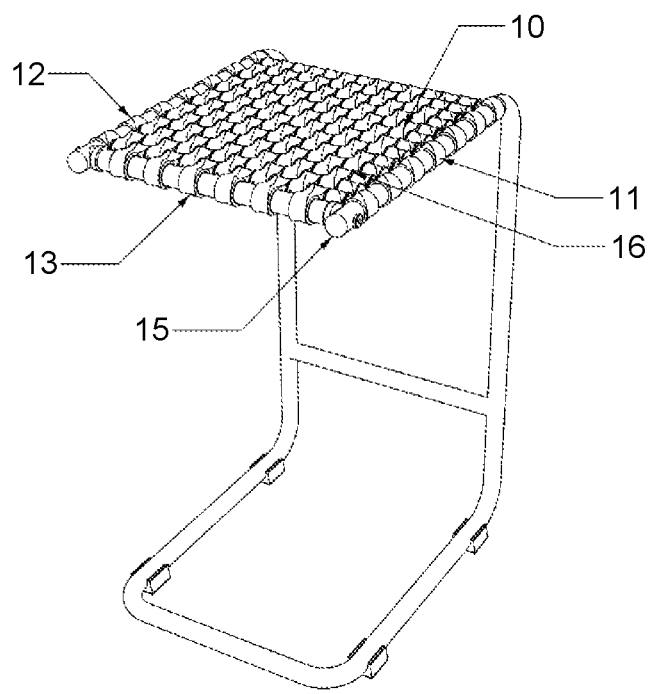
FIG. 11 shows an application of a mesh made up of the parts.

FIG. 11 shows an application of a mesh formed by the parts described herein; in particular, there is a mesh formed with the first parts (10), wherein the first parts (10) form the main body of the mesh. The size will depend on the number of the first parts; it is also possible to have a combination of colors, making the product attractive and allowing the designer in turn to tinkering with the parts to produce visual effects according to the needs. The parts are finished at the ends by the third parts (11) at one end, by the fourth parts (13) at the other end and by the fifth parts (12) at the third end. The second parts (14) are used for the folds. At the end without frame coupling parts, the sixth parts (16) are used, while the seventh parts (15) are used alternately with the fifth parts (12). Finally, the eighth parts are placed alternately with the third parts (11) to cover the cylindrical perforations that do not couple with the third parts (11).

Figure 13A:
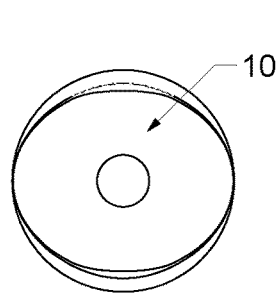
FIGS. 13a, 13b, 13c, 13d, 13e, and 13f illustrate a ninth part of the system of the present invention.
Figure 13B:
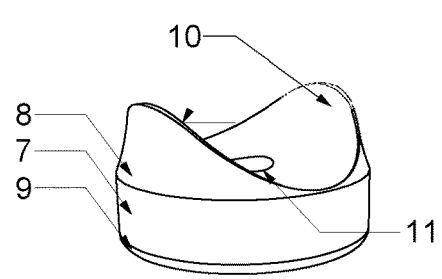
Figure 13C:
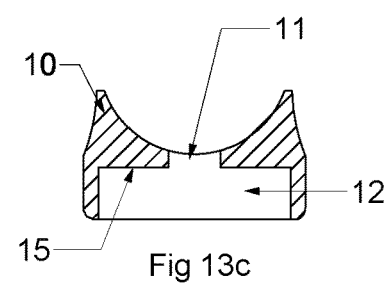
Figure 13D:
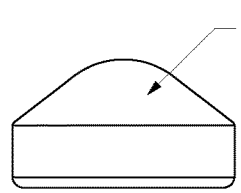
Figure 13E:
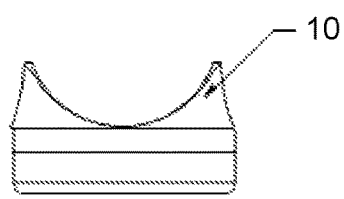
Figure 13F:
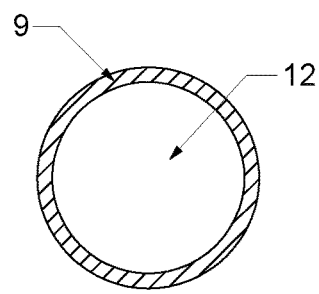

FIGS. 13a, 13b, 13c, 13d, 13e, and 13f illustrate a ninth part of the system of the present invention. The figures show different views of the same part; FIG. 14a shows a top view of the ninth part, FIG. 13b shows a top perspective view of the ninth part; FIG. 13c shows a front view of the ninth part; FIG. 13d shows a right-side view of the ninth part; FIG. 14e shows the cutout of FIG. 13c and FIG. 14f shows a bottom view of the ninth part. In particular, the ninth part relates to a fishmouth finish defined by a hollow main body (7) of preferably circular shape, without being limited to that shape, which has an upper edge (8) and a lower edge (9). From said upper edge (8), two substantially semicircular upward projections (10) arise, defining the upper surface as a fishmouth. In turn, a central opening (11) is formed in the upper surface of the main body (7) between both upward projections (10).

Due to the addition of the upward projections (10), the inner part of the main body (7) defines a housing zone (12) configured to introduce the end of a guide tube (13) or nipple (14) forming the outer frame of the structure to be formed.

Figure 14:
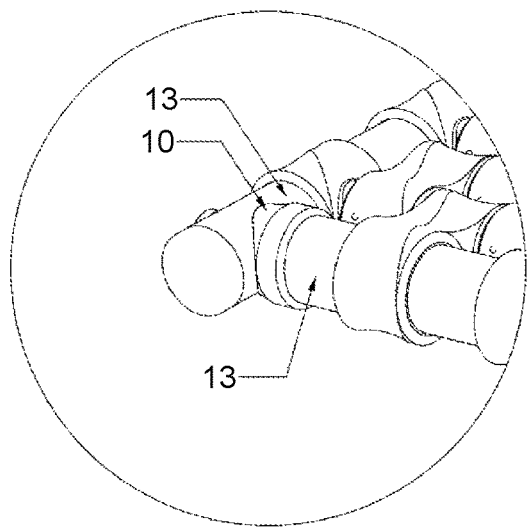
FIG. 14 shows a close-up view of the ninth part in use within the system of the present invention.

Particularly, this part has the function of being placed perpendicularly on the surface of a guide tube (13) or nipple (14) to define a "T" shaped element which allows finishing the frame of a structure, as shown in the close-up of FIG. 14. In order to do this, the end of a guide tube (13) or nipple (14) is introduced into the lower opening of the lower end (9) of the main body until it rests on the inner face (15) of the upper surface of the main body (8) formed by the upward projections (10). An anchoring element such as a screw or dowel (without being limited to these anchoring means), passes through the central opening (11) to fix the ninth part to a face of the guide tube (13) or nipple (14). In one embodiment of the present invention, the coupling between the ninth part and the guide tube (13) or nipple (14) is achieved by means of an adhesive.

Figure 16:
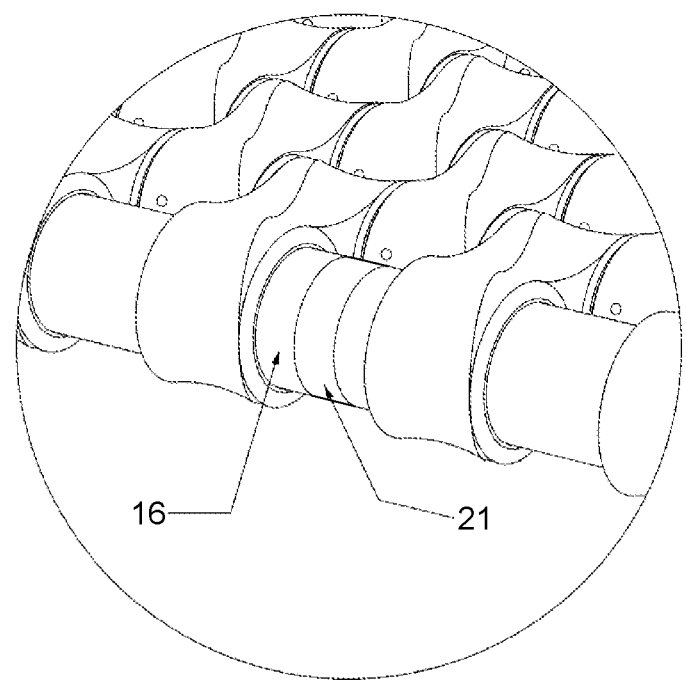
FIG. 16 shows a close-up view of the tenth part in use within the system of the present invention.

FIGS. 15a, 15b, 15c, and 15d illustrate a tenth part of the system of the present invention. The figures show different views of the same part; FIG. 14a shows a perspective view of the tenth part, FIG. 14b shows a top view of the tenth part, where its bottom and side views are the same; FIG. 14c shows a front view of the tenth part, and finally, FIG. 14d shows the cut-out of FIG. 14b. In particular, the tenth piece relates to a nipple (14) that is used to join the parts (any of the aforementioned) to define the desired structure. Each nipple (14) is formed by a hollow cylindrical main body (16) which can be of any size necessary to achieve its purpose since its length will vary depending on its position and shape in the structure. The main body (16) also has its upper (17) and lower (18) ends defined by a grooved zone arising from each upper (19) and lower (20) surface, respectively, and extending to a point near the center of the main body (16) covering the entire perimeter face of its determined zone. Furthermore, the central portion of the main body (16) has a perimeter ring (21) that allows a user to hold the main body (16) for placement or removal as show in FIG. 16.

Figure 12:
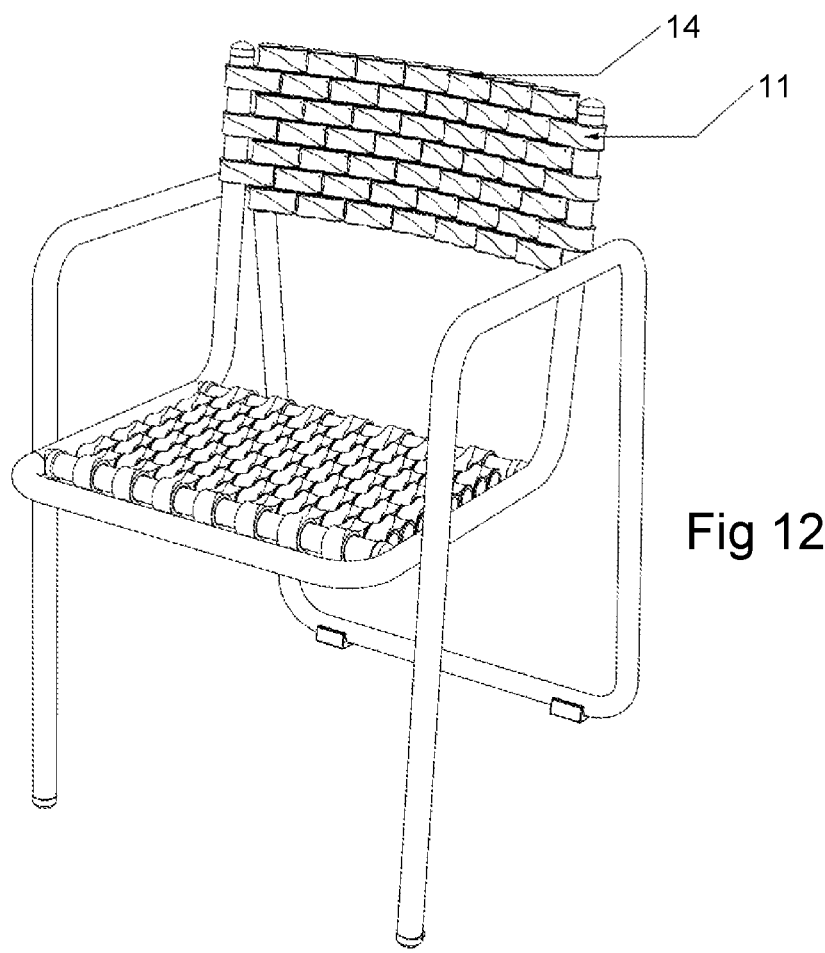
FIG. 12 shows an application of a mesh formed from another type of part.

The upper (19) and lower (20) surfaces are closed, although, in some embodiments of the present invention, they may have openings (not shown) for the passage of elements such as lighting wiring. The grooved zones of each upper end (17) and lower end (18) allow each end of the nipple (16) to be introduced into the assembly means (5) of each part to define a structure, as shown in FIGS. 9 and 10, since generally, these types of nipples (14) define the outer frame of the desired structure forming well-defined surfaces without irregular ends, as shown in FIGS. 11 and 12.

It is worth mentioning that a number of mesh forming parts have been illustrated attached to a frame. However, the mesh may comprise any size, depending on the needs of the designer.

Although preferred embodiments have been shown and described a person skilled in the art can make modifications thereto without departing from the scope or teachings herein. The embodiments described herein are exemplary only and are not limiting. Many variations and modifications of the parts are possible and are within the scope of the invention. For example, the size, number of recesses and projections, dimensions, angles, shapes, and other parameters may be modified. Accordingly, the scope of protection is not limited to the embodiments described herein but is limited only by the following claims, the scope of which will include all equivalents of the subject matter of said claims.

The invention claimed is:

1. A plastic mesh rotary assembly system comprising:
at least a first part comprising male locking means and female locking means with a separating surface wherein,
the male locking means of the first part comprises a substantially cylindrical shape formed by a base portion, a secondary channel, a primary locking channel, and a coupling head having recesses around the periphery; and
the female locking means of the first part comprises a front face and a rear face limited at each end by a rounded side face and, in turn, said female locking means has internally an intermediate reinforcement extending to form a reinforcement zone defining two female housings which are cylindrical perforations having first projections and second projections therein; and
at least one second part comprising a front face and a rear face limited at each end by a rounded side face with a separating surface and, in turn, said second part has internally an intermediate reinforcement extending to form a reinforcement zone defining two cylindrical perforations having first projections and second projection therein;
at least one third part comprising male locking means and assembly means wherein,
the male locking means of the third part has a substantially cylindrical shape formed by a base portion, a secondary channel, a primary locking channel, and a coupling head comprising a having recesses around the periphery; and
the assembly means of the third part comprises a hollow inner diameter;
at least a fourth part comprising male locking means and female locking means with a separating surface, wherein
the male locking means of the fourth part has a substantially cylindrical shape formed by a base portion, a secondary channel, a primary locking channel, and a coupling head comprising a recesses around the periphery; and
the female locking means of the fourth part comprises a front face and a rear face limited at each end by a rounded side face and, in turn, said female locking means has internally an intermediate reinforcement extending to form a reinforcement zone defining a female housing and an assembly means, wherein the female housing is a cylindrical perforation having first projections and second projections therein, and the assembly means comprises a hollow inside diameter;
at least one fifth part comprising first female means and assembly means wherein,
the female locking means of the fifth part has a cylindrical shape that internally defines a female housing with first projections and second projections; and
the assembly means of the fifth part comprises a hollow inner diameter;
at least one sixth part comprising male locking means and female locking means wherein,
the male locking means of the sixth part has a substantially cylindrical shape formed by a base portion, a secondary channel, a primary locking channel, and a coupling head comprising a having recesses around the periphery; and
the female locking means of the sixth part comprises a cylindrical body that internally has a female housing including cylindrical perforations with first projections and second projections therein;
at least one seventh part comprising cylindrical female securing means having a flat top surface and an open bottom surface forming a hollow body defining a female housing inside, with first projections and second projections;
at least one eighth part comprising cylindrical shaped cap means having a closed upper surface and an open lower end defining a hollow housing separated by a low relief perimeter ring;
at least one ninth part comprising a hollow main body of circular shape having an upper surface with two upward projections of substantially semicircular shape at opposite ends, a hollow lower surface forming an inner housing and a central opening in the upper surface; and
at least one tenth part comprising a cylindrical-shaped main body with a hollow interior having upper and lower ends covered by a grooved zone and a perimeter ring in the central portion of the main body.

2. The system according to claim 1, wherein the recesses of the first, third, fourth and sixth parts have a gap of 70° and 145°.

3. The system according to claim 1, wherein in the first projections of the first, second, fourth, fifth, sixth and seventh parts there is an angle ($\alpha$) of 145°, an angle ($\beta$) of 145°, and an angle ($\gamma$) of 70°.

4. The system according to claim 1, wherein the second projections of the first, second, fourth, fifth, sixth and seventh parts have angles ($\theta$) and ($\lambda$) of 120°.

5. The system according to claim 1, wherein the first, second, and fourth parts have a guide point on at least one of their side faces.

6. The system according to claim 1, wherein the first, second, third, fourth, fifth, sixth, seventh, eighth, ninth and tenth parts are made of a material other than plastic.

7. The system according to claim 1, wherein the recesses of the first, second, fourth, fifth, sixth and seventh parts coincide with the position of the first projections of the first, second, fourth, fifth, sixth and seventh parts.

8. The system according to claim 1, wherein the first, second, third, fourth, fifth, sixth, seventh, eighth, ninth and tenth parts ach part can be a right part or a left part.

9. The system according to claim 1, wherein the dimensions of the first, second, third, fourth, fifth, sixth, seventh, eighth, ninth and tenth parts depend on the structure to be formed.

10. The system according to claim 1, wherein the first, second, third, fourth, fifth, sixth, seventh, eighth, ninth and tenth parts can be made of different colors.

* * * * *